CHARACTER RECOGNITION SYSTEM AND APPARATUS

Filed April 21, 1960 6 Sheets-Sheet 1

INVENTORS
W. D. BUCKINGHAM
F. T. TURNER
A. E. HILDRETH Jr.
BY
M. J. Reynolds
ATTORNEY

CHARACTER RECOGNITION SYSTEM AND APPARATUS

Filed April 21, 1960 6 Sheets-Sheet 2

Feb. 16, 1965 W. D. BUCKINGHAM ET AL 3,170,138

CHARACTER RECOGNITION SYSTEM AND APPARATUS

Filed April 21, 1960 6 Sheets-Sheet 3

CHARACTER RECOGNITION SYSTEM AND APPARATUS

Filed April 21, 1960 6 Sheets-Sheet 4

United States Patent Office 3,170,138

Patented Feb. 16, 1965

3,170,138
CHARACTER RECOGNITION SYSTEM AND APPARATUS

William D. Buckingham, Southampton, Frank T. Turner, Hampton Bays, and Alan E. Hildreth, Jr., Southampton, N.Y., assignors to The Western Union Telegraph Company, New York, N.Y., a corporation of New York Filed Apr. 21, 1960, Ser. No. 23,713
12 Claims. (Cl. 340—146.3)

This invention relates generally to an improved character recognition system and apparatus, and more particularly to a system and apparatus for optically reading the alpha-numeric or other characters, or symbols, appearing on a tape or sheet, for example, typewritten or printed information, and generating electrical signals capable of reproducing the characters in any of a desired variety of forms and for various selection and control purposes, such as to produce a typewritten tape or sheet, or a perforated tape or card, and generating teleprinter, data processing or other code signals, or for actuating a type-setting machine, or producing Braille records, etc.

Various character recognition systems heretofore have used or proposed a number of different approaches. For example, in one system an optical image of the character is scanned by a disk having a number of apertures in the form of various letter strokes, i.e., vertical, horizontal, loops, slanted lines and the like. Light passing through the disk strikes a photocell, the output of which is a series of pulses produced when a disk aperture matches an element of the character being scanned. This pattern of pulses is matched to a set of standard patterns, usually by a system of gates or magnetic cores, the pattern obtained by the scanning being thus recognized as typical of a particular character. Another method scans the image of the character with a single row of photocells, a sequence of pulses being produced as the output of the photocells and this sequence of pulses is then compared with a set of standard patterns as above.

Other types of systems have also been proposed, but have required complicated and expensive reading apparatus, storage and interpretative circuits, and in general have proved uneconomical and not sufficiently reliable for commercial communication purposes, particularly for reading and transmitting telegraph messages or similar copy.

It is an object of the instant invention to provide a relatively simple and more reliable character reading system which utilizes a method of character recognition specifically different from those of the prior systems.

Another object of the invention is the provision of character reading apparatus in which an optical image of each character in its entirety is projected by means of a beam of energizing rays capable of being focussed onto an array of potential-producing devices sensitive to said rays, and in which accurate distinction between different characters having similar outlines is obtained by utilizing not only those potential-producing devices covered by the image of the character at the time being viewed but also by certain ones only of the other potential-producing devices of the array which remain uncovered by the image of the instant character but which would be covered by the image of one or more characters otherwise similar in outline to the instant character. Preferably a beam of light rays, readily obtainable from conventional light sources, is employed.

An ancillary object in accordance with the foregoing is to produce one group of electrical potentials by means of the potential-producing devices covered by an instant image and another group of electrical potentials by means of certain ones of the other potential-producing devices which remain uncovered, producing a summation of each group of potentials separately and comparing the results of the summation in a manner to determine the instant character.

A further object is to provide character reading apparatus of the character disclosed, in which output signals of any desired kind may be obtained, depending upon the nature and purpose of the devices to be controlled thereby.

An additional object is apparatus of the foregoing character in which the copy bearing the characters to be read may be viewed either at a uniform rate or at a variable rate.

Further objects are to provide means for detecting spaces in the copy and producing output signals representing the function character Space; to automatically insert printer case shift functional characters, such as Figures Shift and Letters Shift, in the output signals as required by a change from lower case characters to upper case characters, and vice versa; to automatically insert carriage return and line feed characters in the output signals when transmitting from page copy; and to interrupt the reading of the copy for the time necessary to produce and transmit signals representing such functional characters.

Other objects and advantages will be apparent from the following description, taken in connection with the accompanying drawings in which.

Figure 3:
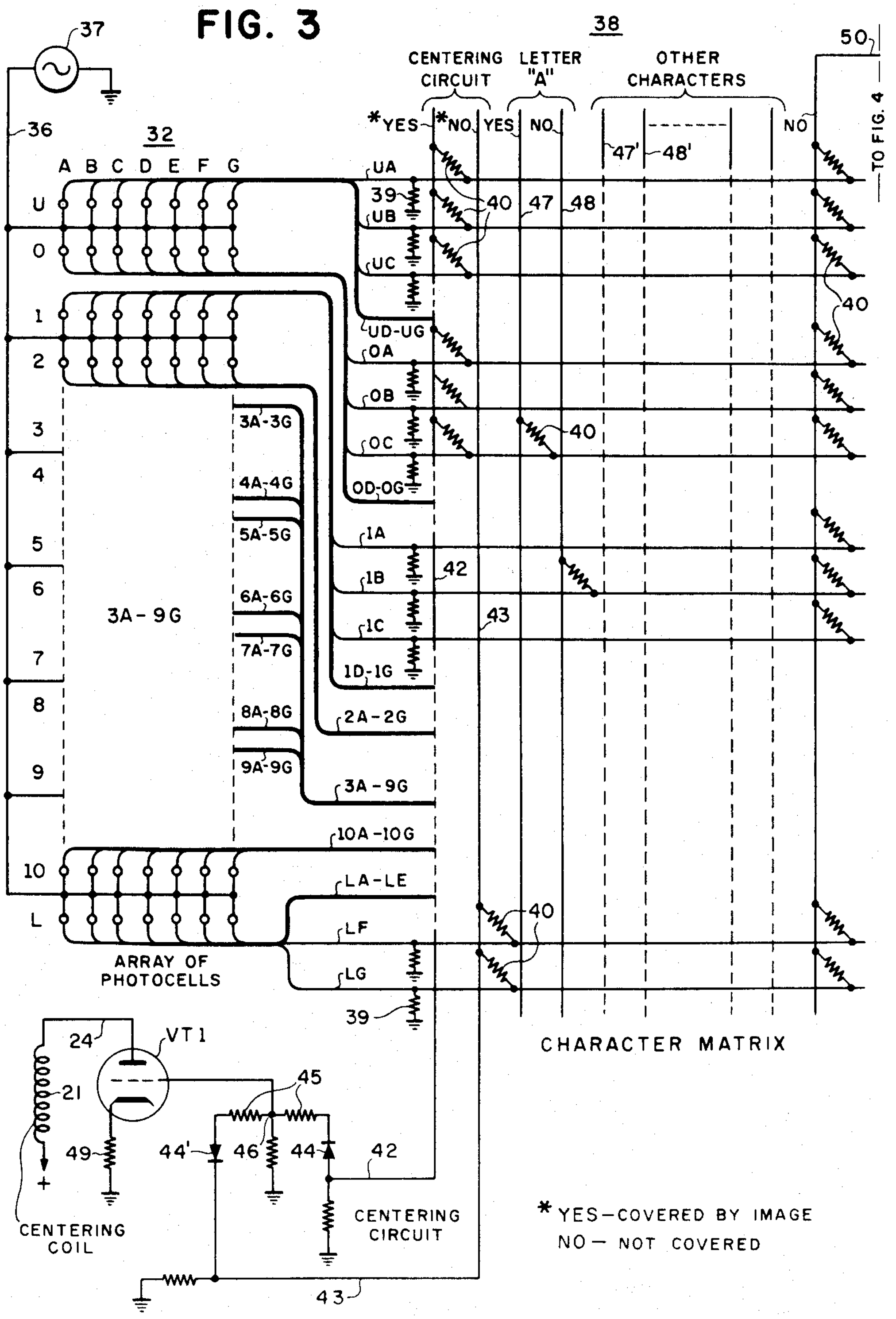
FIG. 3 shows the electrical connections from an array of potential-producing photocells to an associated character matrix for producing the potentials employed for character recognition purposes.
Figures 4, 8, 9:
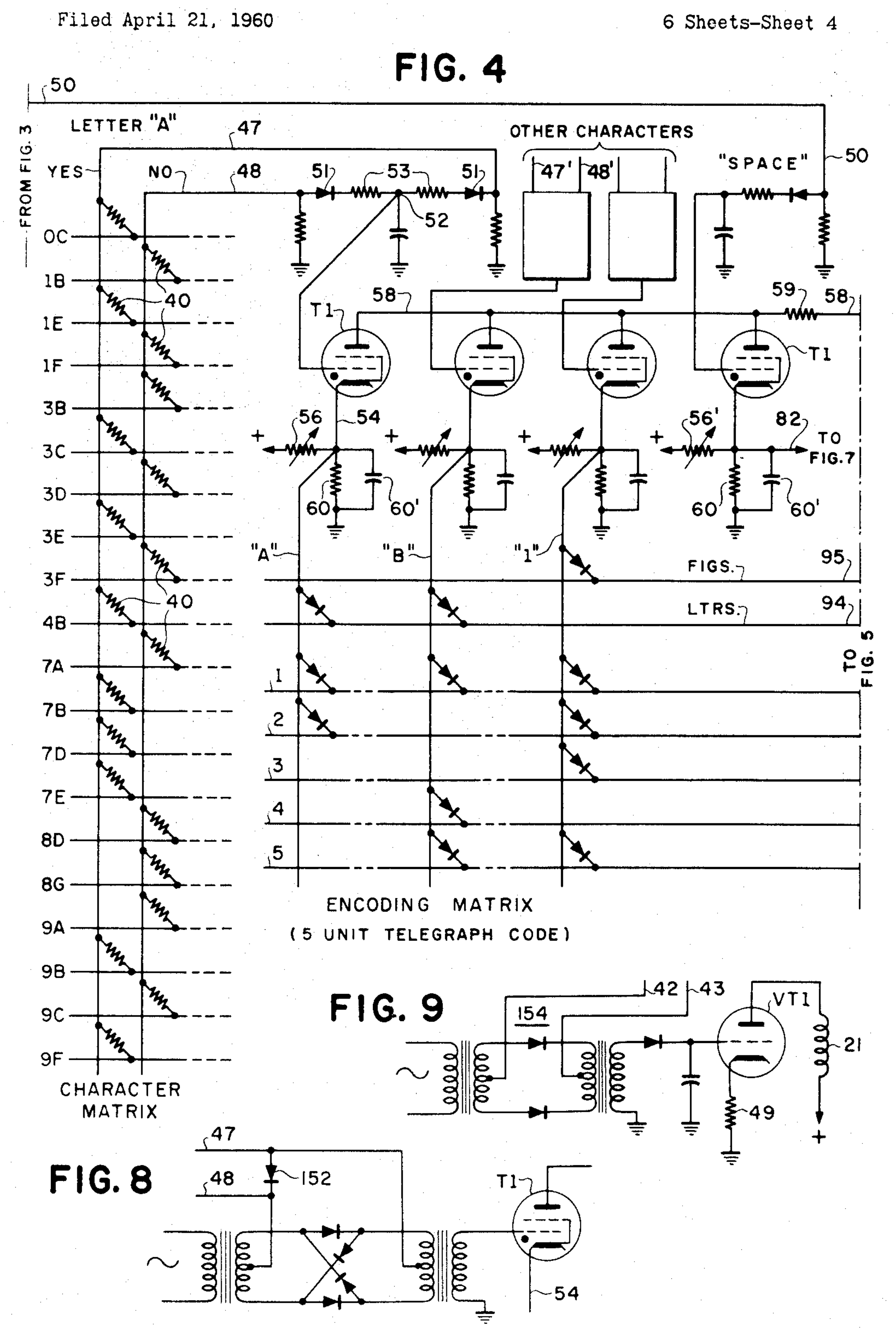
FIG. 4 shows circuits for integrating the potentials obtained from the character matrix, and also an associated encoding matrix for producing 5-unit code telegraph characters.
Figure 6:
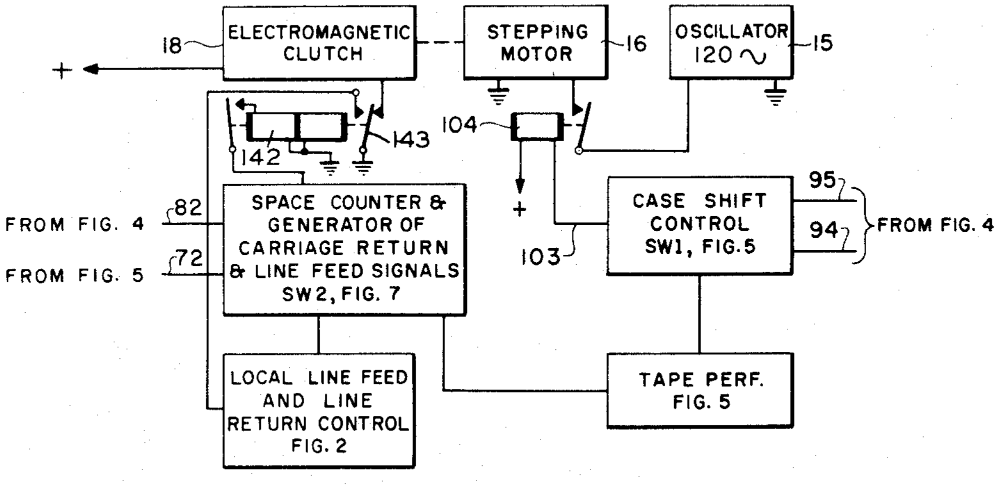
Figures 7, 10:
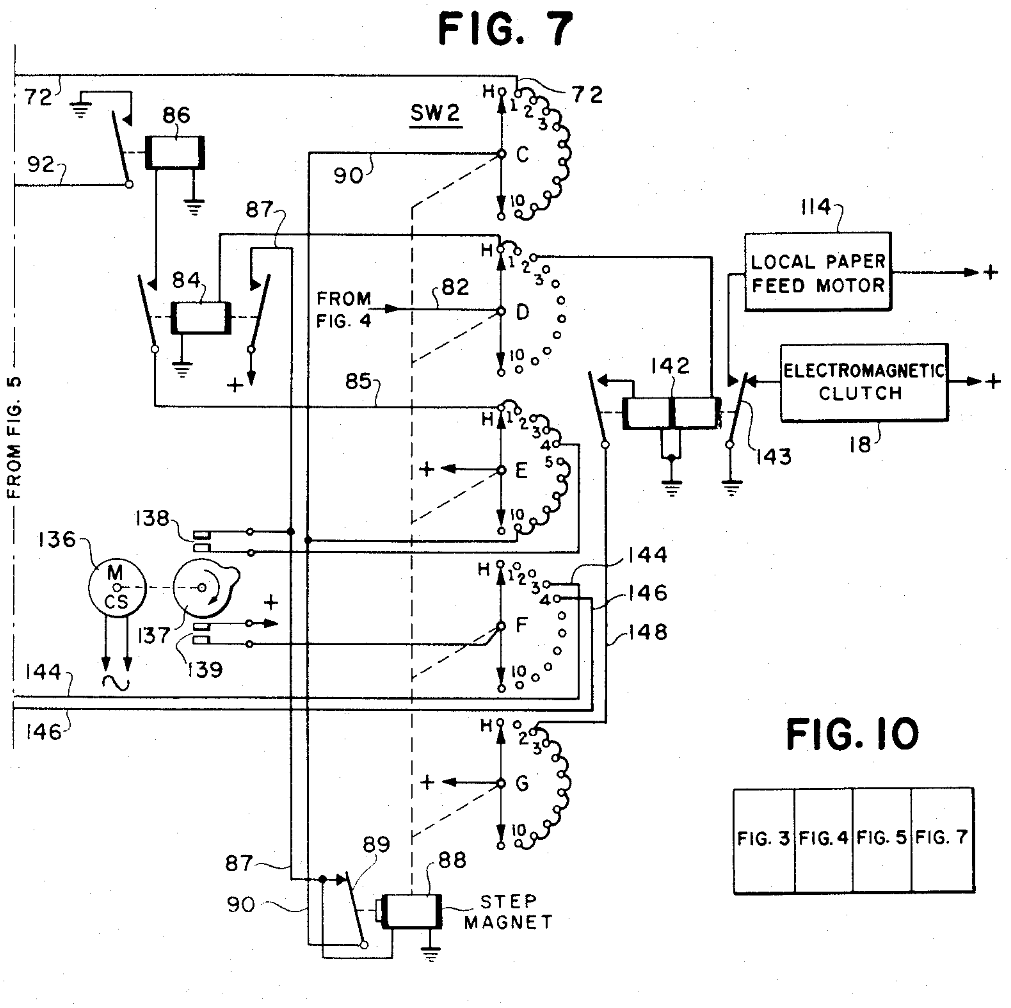

FIG. 6 diagrammatically shows means for automatically effecting line return and line feed operations when reading page copy;

FIG. 7 shows circuit details for producing carriage return and line feed functional characters as required for transmitting page copy;

FIGS. 8 and 9 show modifications of matrix output circuits when direct current is employed to energize the potential-producing photocells; and FIG. 10 shows how FIGS. 3, 4, 5 and 7 should be arranged with respect to each other.

Figure 1:
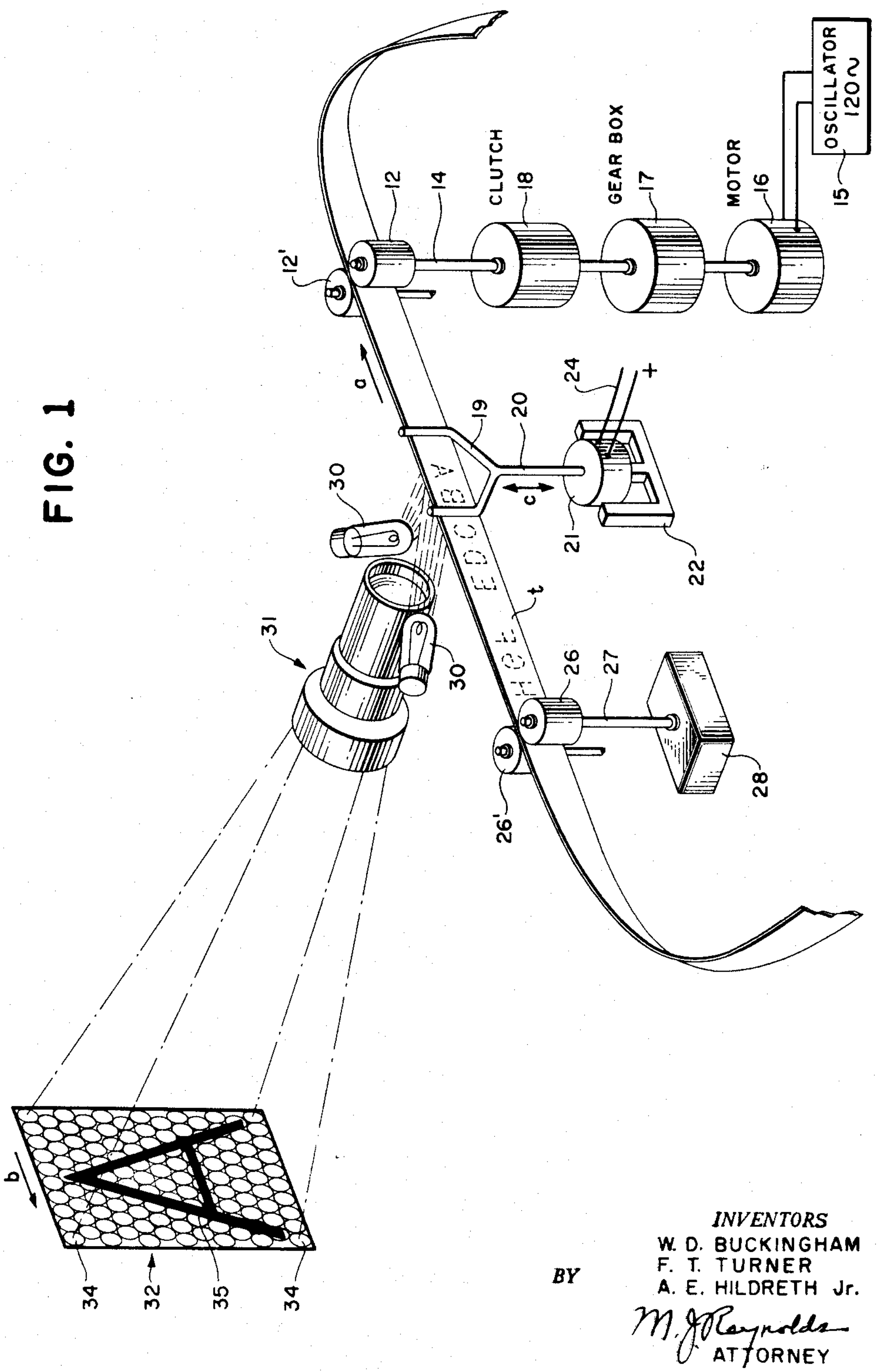
FIG. 1 illustrates how printed characters on a length of telegraph tape may be illuminated successively by a light beam in a manner to cause an image of each character in turn to be projected onto an array of potential-producing photocell devices in accordance with the instant invention.

The illustrative embodiment shown in FIG. 1 of the drawings is arranged to read characters from a teleprinter tape *t*. The tape is caused to move through the viewing field, in the direction of the arrow *a*, in any suitable manner, as by means of a tape feed roller 12 and an idler roller 12'. The roller 12 is secured to the shaft 14 which is driven by means of a motor 16 through a reducing gear box 17 and an electromagnetic clutch 18, the motor preferably being powered by an oscillator 15; the motor is of a known type which steps a predetermined constant angular amount for each pulse received from the oscillator. A tape carrier 19 is secured to a shaft 20 of a centering coil 21 mounted to move upwardly or downwardly with respect to a permanent magnet structure 22, as indicated by the arrow *c*, depending upon the value of current flowing through conductor 24 connected to the coil 21. A loud speaker magnet of known type may be employed for this purpose. The movement upwardly or downwardly of the tape carrier 19 slightly raises or lowers the tape *t* with respect to the viewing field. The trailing portion of the tape may have a slight drag imposed thereon in any suitable manner, as by a snubbing roller 26 and idler roller 26', the snubbing roller being secured to the shaft 27 received within a mounting 28; a leaf spring or other suitable means within the mounting structure, may be employed to apply a slight drag to the shaft 27 and hence to the snubbing roller 26 to keep the tape substantially taut.

Adjacent to the viewing position are two lamps 30 which floodlight the area of each character as it is advanced through the viewing field. In the drawing the letter A is shown as being in the viewing field, and the reflected image of this character passes through a lens 31 and is projected onto the array or field 32 of potential-producing devices 34, preferably photocells. These photocells are small in diameter and are closely positioned adjacent to each other, preferably by a staggered arrangement of the various rows. The lens 31 preferably is of the zoom type which is adjustable so that the projected image may be enlarged to an optimum size regardless of the size of the characters appearing on the tape; that is, the lens is of a type in which the focal length may be changed to effect a desired enlargement.

As the tape *t* is advanced in the direction of the arrow *a*, preferably although not necessarily, at a uniform rate, an enlarged image 35 of the character is projected onto the photocell array 32 and as the image sweeps across the array, in the direction of the arrow *b*, the light and dark portions of the projected image affect the photocells to produce a complex electrical output from the array which is unique to the particular character at the time being viewed. The outputs from a number of the photocells especially selected for each character are combined in a resistance network to produce a maximum voltage on an output circuit which is individual to the character whose image is then centered on the photocell array. If desired, the elements 34 of the array may comprise small closely packed light-transmitting tubes of quartz, Lucite, or the like, and such tubes will permit closer packing and will conduct the light falling thereon to photocells mounted in the rear of the array. The array shown in FIG. 1 comprises 13 horizontal rows each containing 7 photocells or light-transmitting tubes, as the case may be, although the number of these elements in the array may be increased or decreased depending upon the nature of the characters to be viewed and the desired definition to be obtained.

FIG. 3 is a circuit diagram showing the connections between the various photocells and a character matrix 38. The horizontal rows of photocells or light-transmitting tubes are identified from top to bottom as row U, rows O through 10, and row L. The columns or vertical rows are identified as A through G. Rows U and L are used almost exclusively for centering the projected characters with respect to the top and bottom of the array. Rows O and 10 are also used for centering the characters in conjunction with rows U and L but are used in addition along with rows 2 through 9 for identifying characters. Each of the photocells has one side thereof connected by conductor 36 to a common source 37 of energizing current which is indicated as alternating current, although direct current may also be used with a slight circuit modification as hereinafter explained. The other side of each of the photocells is connected through conductors leading to the character matrix 38.

FIG. 3 also shows the connections from the two upper and two lower rows of photocells to a centering circuit which includes the conductors 42 and 43 of the matrix. A grounded load resistance 39 is connected to each of the conductors extending from the photocells. The figure shows some of the matrix connections for the letter "A" and also the connections for a "Space" whenever a word space is in the text on the tape being read. These matrix connections at the coordinate points are selectively provided by suitable impedance devices 40, usually resistors, at the appropriate junctions. Each of these resistors ordinarily has the same standard value, the choice of this value being determined as follows: It is desired that the outputs on a pair of conductors representing any given character be determined by the presence of at least a majority of the elemental areas of that character and further by the absence of a majority of elemental areas representing any similar character. The resistance values are therefore chosen to cause each photocell to contribute a certain desired proportion of the total output voltage. The eventual decision as to the identity of a character is a consensus of the signal developed by each photocell connected through the matrix to the output circuit for that particular character.

Furthermore, it is desirable that there be a minimum of feedback of signal from a character output circuit through the matrix of the photocells. The value of the junction resistance in conjunction with the summing, or integrating, resistance network determines the fraction of input voltage which appears at the output as a contribution from any one photocell and therefore since the voltage in passing through the matrix is appreciably reduced, the fraction of this voltage which returns through the matrix to disturb the voltage at a particular photocell is minimal. It is desired that the current drawn by each of the junction points of the matrix be sufficiently small so that the total current drawn does not overload any individual photocell and the value of the junction resistance must therefore not be below some minimum value. In the illustrative embodiment of FIG. 3, five megohms is a suitable value for each resistor 40.

In some cases where a particular portion of a character or a particular portion of an interfering character of similar outline is considered of more than average significance, this may be given added computational weight by the use of two or more resistors in parallel at the appropriate matrix junction, or by using a resistor of lower value.

Illustrative examples of suitable matrix connections at the coordinate points thereof for coupling the photocell devices selectively to the output conductors representing various letters and digits are given in the table below, remembering that "Yes" means covered, and "No" means uncovered, with respect to the photocell devices in each group:

Letter A:
 Yes—OC, 1E, 3C, 3E, 4B, 7B, 7D, 7E, 9B, 9F
 No—1B, 1F, 3B, 3D, 3F, 7A, 8D, 8G, 9A, 9C
Letter C:
 Yes—OA, OC, 1A, 2A, 3F, 6F, 8A, 8E, 9B, 10C
 No—1G, 3A, 4A, 4B, 5A, 6A, 6B, 7A, 9A, 10A
Letter G:
 Yes—OC, 1B, 3A, 5G, 6A, 6B, 6C, 8A, 10A, 10D No—OA, 1E, 4A, 5A, 5A, 5B, 5E, 7B, 10B, 10F Letter I:

Yes—OD, 1E, 2D, 3E, 4D, 6D, 7E, 8D, 9E, 10D

No—UE, OC, 1F, 2F, 5C, 5C, 5F, 9B, 10A, 10F

Letter J:

Yes—1B, 3B, 5B, 7B, 7G, 8F, 9C, 9F, 10D, 10E

No—OC, OE, 3G, 5A, 6F, 8C, 9B, 10A, 10B, 10F

Letter O:

Yes—1C, 1F, 3B, 4G, 6A, 7G, 8A, 9F, 10C, 10E

No—1B, 1B, 1B, 1G, 5F, 6B, 8C, 10A, 10F, LB

Letter Q:

Yes—1B, OD, 2F, 6A, 7G, 8C, 9C, 10B, 10D, LB

No—OF, 1A, 1A, 2B, 2B, 5E, 7C, 9B, 10A, 10F

Letter Z:

Yes—OB, OD, OF, 2B, 3C, 7E, 8E, 10A, 10C, 10F

No—2E, 2G, 3E, 3G, 5C, 5E, 5E, 5F, 6C, 8G

Digit 1:

Yes—OC, 1E, 1E, 1F, 1F, 1F, 3C, 5C, 7C, 9C

No—OE, 1B, 1B, 3E, 3F, 3G, 4F, 4F, 5G, 6B

Digit 2:

Yes—OD, 1B, 2F, 3F, 4B, 6D, 7E, 9F, 10A, 10C

No—3C, 5E, 5E, 5F, 5F, 6A, 6F, 6G, 7D, 8A

The proper coordinate points which determine the photocell devices included in each group for reading a given style of characters may readily be determined empirically; a convenient method for determining this is to print enlargements of the characters respectively on transparent sheets and then superpose on each other in alignment the sheets bearing those characters which more closely resemble each other in outline, and transilluminate the superposed sheets to determine the most effective points of distinction. In the foregoing table it will be noted that for the letter C the coordinate points cause the photocell devices 3A, 6A, 6B and 10A to be included in the "uncovered" (No) group whereas in the somewhat similar letter G these same photocell devices are included in the "covered" (Yes) group. Similarly, the photocell devices 1B, 8C and LB appear in the uncovered group for the letter O whereas in the similar letter Q these same devices appear in the covered group.

It will be noted that with respect to the letter O the coordinate point 1B connected to the "uncovered" output conductor for that character causes the associated photocell 1B to have three times the usual weight for integration purposes, as indicated by the repetition of the coordinate designation in the table, i.e., the value of three resistances 40 connected in parallel at the coordinate point 1B is but one-third that of the usual resistance at a coordinate point, and the contribution from this photocell will be corresponding greater. A single resistance having one-third the value of the usual coupling resistance may, of course, be used instead of three usual resistances connected in parallel. Other examples of additional weights given to coordinate points and hence to their associated photocells are 5A and 5C respectively in the "uncovered" output conductors for the letters G and I; the points 1E and 1F in the covered output conductor for the digit 1, and 1B and 4F in the uncovered output conductor; and the points 5E and 5F in the uncovered output conductor for the digit 2. The selection of the most effective coordinate points and their associated photocells for character recognition obviously will depend upon the style of the characters appearing on the copy to be read.

The fact that the number of uncovered photocells utilized as the "No" subgroup in regard to any character is much less than all of the uncovered photocells in the array greatly increases the differential between the resultant potential produced by the group representing the character currently being viewed and the resultant potential produced by any other of the groups at that time and also the resultant potential produced by the first mentioned group as a result of viewing any other character, thereby to discriminate accurately between different characters having similar outlines. Preferably the number of photocells and/or the computational weights thereof coupled to the covered output conductor individual to a given character is equal or approximately equal to the number and/or computational weights of the photocells coupled to the uncovered output conductor of that character to thus increase the differential.

The centering circuit includes two vertical conductors 42 and 43, conductor 42 being a "Yes" conductor (photocells covered by image) to which the photocells of the two upper horizontal rows U and O are connected by the resistances 40, and conductor 43 representing the "No" conductor (photocells not covered by image) to which the photocells of the two lower horizontal rows 10 and L are connected. Since the source of A.C. current 37 is connected to all the photocells, the output of each of the cells of the two upper and two lower rows and therefore each output conductor 42 or 43 of the matrix has an A.C. voltage of some particular magnitude. The output on conductor 42 from the upper rows of centering photocells is rectified by a diode 44 to develop a positive voltage, while the output on conductor 43 from the lower rows of centering photocells is rectified by a diode 44' to produce a negative voltage. The magnitude of each of these voltages will be determined by the position of the character image on the photocell field with respect to these upper and lower rows of cells. The two voltages are combined in a resistance network 45 and averaged so that if the two voltages are equal in magnitude the net output will be zero at the midpoint 46 of the resistor network. This condition prevails in the case of a blank field and also in the case of the character properly centered with respect to the top and bottom of the photocell field.

If, however, a character is too high more photocells in the upper rows will be covered by the image, including the photocells in the row U, whereas fewer cells in the two lower rows including the photocells in row L will be covered. The output voltage from the upper cells will therefore be smaller and the output voltage from the lower rows of cells will be greater. Since the two voltages, opposite in polarity, are no longer equal there will be a net voltage developed at the point 46, and this voltage is applied to the grid of a vacuum tube VT1 whose plate current flows through conductor 24 and the centering coil 21. The voltage at point 46 therefore varies the coil current causing the coil to rise or fall as necessary to restore the character to its proper position on the photocell field. With a blank field the upper two rows of photocells will cause, for example, a potential of +14 volts to be developed on conductor 42 and a potential of −14 volts to be developed on conductor 43 so that the net voltage at the point 46 will be zero. With a properly centered character, a potential of +10 volts will be developed on conductor 42 and a potential of −10 volts developed on conductor 43, so that the net voltage at the point 46 again will be zero. If the character is high a potential of, for example, +6 volts may be developed on conductor 42 and a potential of −14 volts developed on conductor 43, so that a net potential of −8 volts will appear at the point 46; if a character is too low on the field a potential, for example, of +14 volts is developed on conductor 42 and a potential of −6 volts developed on conductor 43, resulting in a net potential of +8 volts at the point 46. With a proper value of the biasing resistor 49 in the cathode circuit of the tube VT1, the flow of current in the tube will cause the position of the centering coil 21 to remain constant if the image is centered or to be varied in either direction to effect proper centering of the character at the time being viewed.

The character matrix of FIG. 3 also shows a "Space" conductor 50 which is connected by a resistance 40 at the junction point of each of the horizontal leads extending from the photocells, so that when a word space is encountered the value of the voltage developed on conductor 50 will provide an indication to this effect.

FIG. 4 shows in greater detail the junction connections for the letter A. This figure does not show the complete character matrix or all of the photocell connections, but it does include all of the photocell connections employed to identify the letter A. The two output conductors 47 and 48 are shown, conductor 47 being the "Yes" (covered) conductor and conductor 48 being the "No" (not covered) conductor. Conductor 47 has a negative voltage developed thereon and conductor 48 has a positive voltage developed thereon when viewing the letter A on the tape. The resistors 49 are shown connecting the "Yes" conductor to those photocells which should be covered when the letter A is on the photocell field and the "No" conductor 48 is shown connected to the photocells which should not be covered when the letter is on the field. Such an arrangement is essential for the positive identification of any particular character as compared to any otherwise similar character. The two conductors are connected through diode rectifiers 51 to a mid-point 52 in the resistance network 53. When the letter A is on the screen a maximum positive voltage is developed at the point 52, and this voltage is substantially higher than the voltage appearing on any other character line 47', 48' and is also substantially higher than the voltage appearing at this point when some other character is on the photocell field. In practice, it has been found possible in most cases to achieve a ratio of approximately 2:1, although where characters quite similar in outline are concerned the ratio may be lowered to 4:3. In either event the potential appearing at any point 52 for a particular letter will be sufficient to trigger an associated thyratron tube T1 which is biased by means of a variable resistor 56 to a voltage such that the tube will not fire for any other character. Each of the thyratrons T1 is individual to a particular character. The thyratrons have a common anode supply over conductor 58 through a limiting resistor 59, and each thyratron has its major load in its cathode circuit comprising a grounded resistor 60 bypassed by a capacitor 60'. When a tube fires, its anode voltage and therefore the anode of all of the thyratron tubes, drops almost instantly very near to ground potential because of the bypass capacitor 60', and this tends to prevent any other tube from firing should a triggering voltage inadvertently appear on the grid of another thyratron. Within a short time, of the order of a few milliseconds the voltage at the cathode rises to its normal value and this output voltage is then selectively applied in the embodiment shown in FIG. 4 to five horizontal conductors 1 to 5 in a neon or other diode encoding matrix for the purpose of generating the 5-unit telegraph code for the particular character at the time being viewed.

The conductors 1 to 5 respectively represent the five code levels in 5-unit code. Conductors 1 and 2 connected by diodes to the letter line "A" will cause the first two code units to be marking, and the unconnected conductors 3, 4 and 5 will cause the other three code units to be spacing, to represent the letter A. The line "B" is connected to form the code units for that letter, and the line "1" is connected to form the code units for the digit 1.

Figure 5:
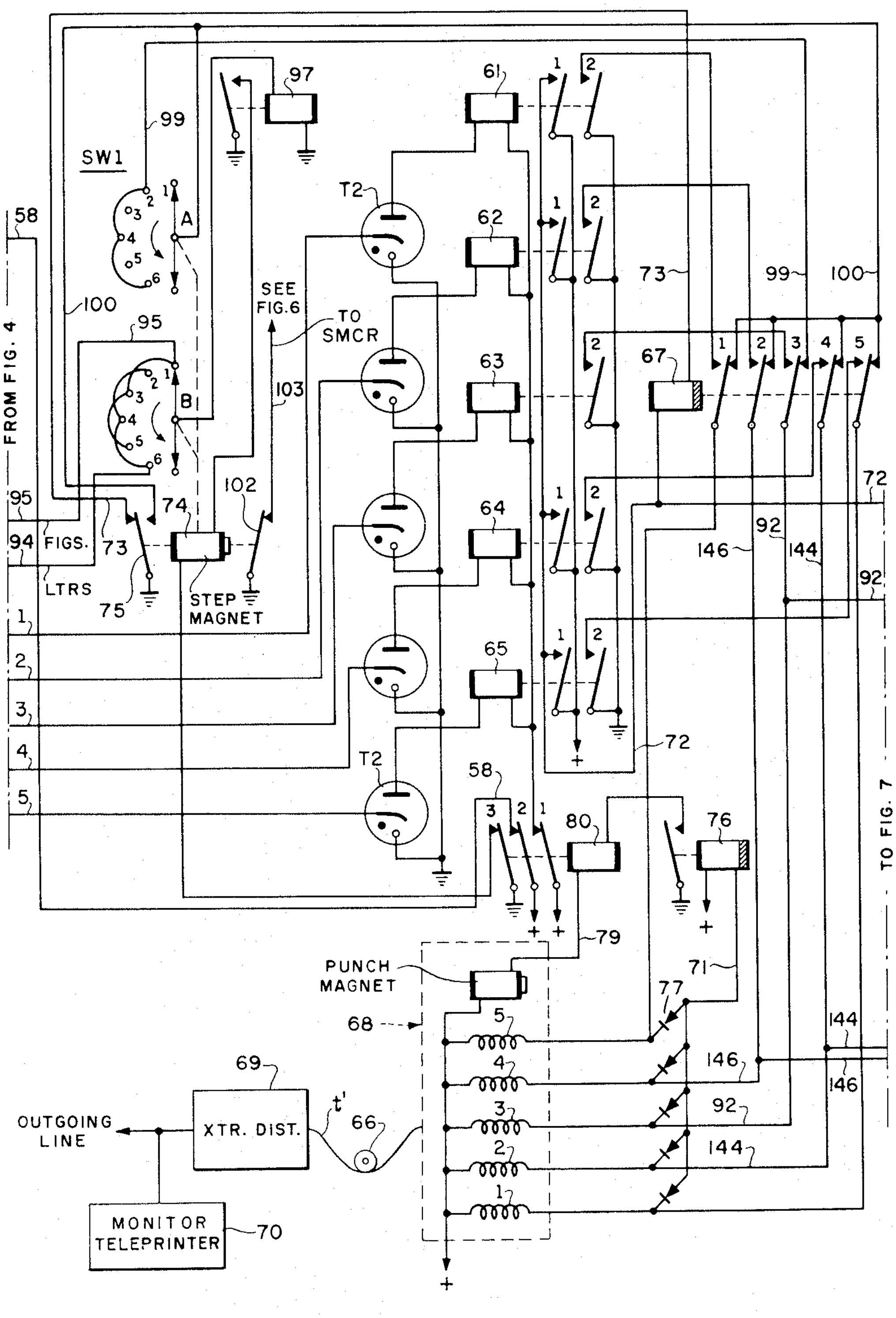
FIG. 5 shows circuits for applying the encoded telegraph characters to an outgoing line, and also means for automatically inserting lower case and upper case shift characters as required.

FIG. 5 shows the horizontal code conductors 1 to 5 of the matrix extending to five cold cathod thyatrons T2 which respectively control five code pulse relays 61 to 65. The outer righthand contacts 2 of these relays are connected to make contacts associated with armatures of a slow-operating transfer relay 67 which when it operates is hereinafter explained applies the code pulses set up on relays 61 to 65 to energize the corresponding selector magnets of a tape perforator 68. The perforated tape $t'$ issuing from the perforator passes to a transmitter distributor 69 which causes 5-unit code telegraph signals to be transmitted to the outgoing line; when start-stop signals are to be transmitted the transmitter distributor automatically inserts the start and rest pulses in well known manner, for example, as disclosed in the U. S. patent to Zenner, No. 2,404,339, issued July 16, 1946. A sufficient supply of tape in the loop between the perforator and transmitter is maintained in known manner by transmitter auto-stop mechanism controlled by the position of a roller 66 which rides in the tape loop. A monitor telegraph printer 70 is provided for keeping a record of the characters transmitted.

The operation of any of the pulse relays 61 to 65, with the exeception of the third pulse relay 63, establishes a circuit from battery through the inner contact and armature 1, conductor 72, winding of slow operating relay 67, and conductor 73 to the left hand break contact associated with an interrupter spring 75 of a step magnet 74 for a stepping switch SW1. Relay 67 operates after a predetermined time delay to connect the selector magnets of the perforator through made contacts and armatures 1 to 5 of relay 67, to the pulse relay contacts 2 of the energized ones of the pulse relays. A slow-operating relay 76 operates (after a predetermined time delay to insure operation of the selector magnets) over a circuit comprising conductor 71, one or more of the diodes 77, contacts of the now operated relay 67, and ground on the armature 2 of one or more of the energized pulse relays. The operation of relay 76 closes a circuit which extends through the winding of a relay 80 and conductor 79 to the punch magnet of the perforator, causing the code set up in the selector magnets to be punched in the tape. At its armature and contact 2, the operation of relay 80 opens the battery supply circuit 58 to thereby interrupt the thyratron plate circuits of FIG. 4 and restore the tubes to readiness for reading the next character. At its armature and contact 1, relay 80 opens the battery supply circuit for the code relay 61 to 65, and at its armature and contact 3, relay 80 opens the operate circuit of the step magnet 74.

It is necessary that spaces between words in the copy be positively identified as such and that the functional character "Space" be generated for transmission over the output circuit. A convenient way of effecting this involves detection of the presence of the total current drawn by all the photocells collectively in the array. Referring to FIGS. 3 and 4, it will be noted that the output line 50, which is connected to all of the photocells, includes a rectifier and resistance in a network, FIG. 4, and that the output of the network is applied to the grid of a "Space" thyratron T1. The current received over conductor 50 will be at a maximum value when there is no character or portion of a character in the field. The "Space" thyratron is suitably biased by a resister 56' to cause the thyratron to fire only under this condition and apply its output to a conductor 82 which leads to the wiper arm of switch bank D, FIG. 7, of a rotary switch SW2. When in its home position H, as shown, the battery on conductor 82 energizes a relay 84, which at its left-hand armature and contact closes a circuit 85 from the wiper of switch bank E energize a relay 86. Closure of the contacts of relay 86 applies ground potential to a conductor 92 that extends to the third code conductor in FIG. 5 which leads to the third selector coil of the perforator. This also causes relay 76 of FIG. 5 to operate over conductor 71 and, in turn, the punch magnet is operated, by the contacts of relay 76, in series with relay 80 to perforate the code signal for "Space". Operated relay 84 of FIG. 7 at its right hand armature and contact applies battery over a circuit comprising conductor 87, and the grounded winding of the step magnet 88 of the rotary switch to energize the magnet. Relay 80, FIG. 5, operates simultaneously with the punch magnet and, at its contacts 2, opens the anode supply to the Space thyratron of FIG. 4, thus deenergizing relay 84 of FIG. 7. The release of relay 84 deenergizes the step magnet 88 and this causes the switch bank wipers to step from contact H to contact 1. Contacts 1 to 10 of switch bank C are strapped together, and if battery is present on conductor 72, the switch wiper, conductor 90 and interrupter spring 89 of the step magnet cause the switch SW2 to self-step around to its home position H; this occurs when one or more of the code pulse relays 61, 62, 64 and 65 of FIG. 5 is operated upon the appearance of a subsequent character (other than Space) in the viewing field. Switch SW2 and associated circuitry are required when reading page copy hereinafter described.

A further problem that arises is that of recognizing the need for generating functional signals for upper case shift and lower case shift, for example, figures shift and letters shift. In the letters shift, or lower case, position of a telegraph printer the characters comprise the letters of the alphabet, whereas in the figures shift, or upper case, position the digits 0, 1 to 9 and various punctuation marks and miscellaneous characters are printed. The character matrix, as hereinbefore set forth, has a separate output for each of the letters, figures and other characters which may be read. Referring to FIG. 4, the output lines representing the lower case characters, for example, "A" and "B", are all connected by diodes to a "letters" signal line 94 and the upper case characters, for example, the digit "1" are all connected to a "Figures" signal line 95. These conductors extend to FIG. 5 to control the rotary switch SW1 and associated circuits for the insertion of a figures shift functional character or a letters shift functional character, as required.

The outputs of the lower case signal line 94 and upper case signal line 95 respectively pass through a control bank B on the switch SW1 having alternate contacts thereon wired to these lines; contacts 1, 3 and 5 are connected to the figures signal line 95 and contacts 2, 4 and 6 to the letters signal line 94, although when letters are being viewed the switch arm will be resting on position 1, 3 or 5, and when figures of the upper case characters are being viewed the switch arm will be resting on position 2, 4 or 6. The switch arm or wiper of bank B is connected, through the contacts of a relay 97 when energized, to the step magnet 74. Successive positions of the switch arm therefore correspond alternately to the upper case and lower case condition. For example, with the switch wipers of banks A and B on position 1, as shown, letters characters are being viewed. If, however, a signal appears on conductor 95 due to the appearance of a figure or other upper case character in the viewing field, a circuit is completed through the switch arm of bank B and relay 97; the relay operates and at its contacts energizes the step magnet 74 of the rotary switch. Ground potential from the armature 75 and associated make contact of the step magnet is applied over conductor 100 to the break contacts and armatures 1, 2, 4 and 5 of relay 67 so that the selector magnets 1, 2, 4 and 5 of the perforator will be energized, thus setting up the code combination for a figures shift functional character.

At its armature 102 the energized step magnet opens a circuit 103 which leads to a stepping motor control relay 104, FIG. 6, causing this relay to release and interrupt the power applied to the stepping motor 16. The movement of the tape is thus arrested and the image of the character currently projected on the photocell field remains stationary during the following operations. At this time, as when any character is sent, the appearance of ground potential on any selector magnet lead completes a circuit through one or more diodes 77 to energize the slow-operating relay 76. After a delay sufficient to insure operation of the selector magnets, relay 76 operates and energizes the punch magnet of the perforator and the relay 80 in series. The operation of relay 80 at its armatures 1, 2 and 3 opens the thyratron plate circuit supply 58 of FIG. 4, and also the common battery supply for the pulse relays 61 to 65, and energizing circuit for the step magnet 74, permitting the rotary switch to step to the next position. When the step magnet is released, the armatures 75 and 102 are restored and the relay 104 of FIG. 6 operates to reapply power to the stepping motor. Since the character currently being viewed is still imaged on the photocell field, it will again develop an output on the appropriate output circuit and reoperate the pulse relays 61 and 65, but this time since the switch SW1 is now in the correct position for upper case characters it will not again step, and the circuit for the slow operating relay 67 is reestablished. After a predetermined time delay the relay operates and connects the perforator selector magnets to the actuated pulse relay contacts, and the proper selector magnets are thereby energized and the perforator punch cycle is initiated as hereinbefore described.

In position 2 of the rotary switch SW1, a circuit is prepared so that upon the appearance of the next lower case character in the viewing field ground potential will be applied over conductor 100 to break contacts and armatures 1, 2, 4 and 5 of relay 67, and also through the wiper and contacts of bank A of SW1 and conductor 99, to break contact 3 and armature of relay 67 and hence to the all selector magnets of the perforator to thereby set up the letters shift functional character in which all of the code pulses are marking.

If a succession of upper case characters appears, the rotary switch remains in the upper case position and transmission of the upper case characters is uninterrupted; when the next lower case character appears, the switch is stepped to its next position which is again a lower case position and at the same time transmission of the lower case character is delayed and a letters shift functional character is inserted, followed by the lower case character. If a succession of lower case characters now appears, the transmission of the lower case characters will be uninterrupted.

Figure 2:
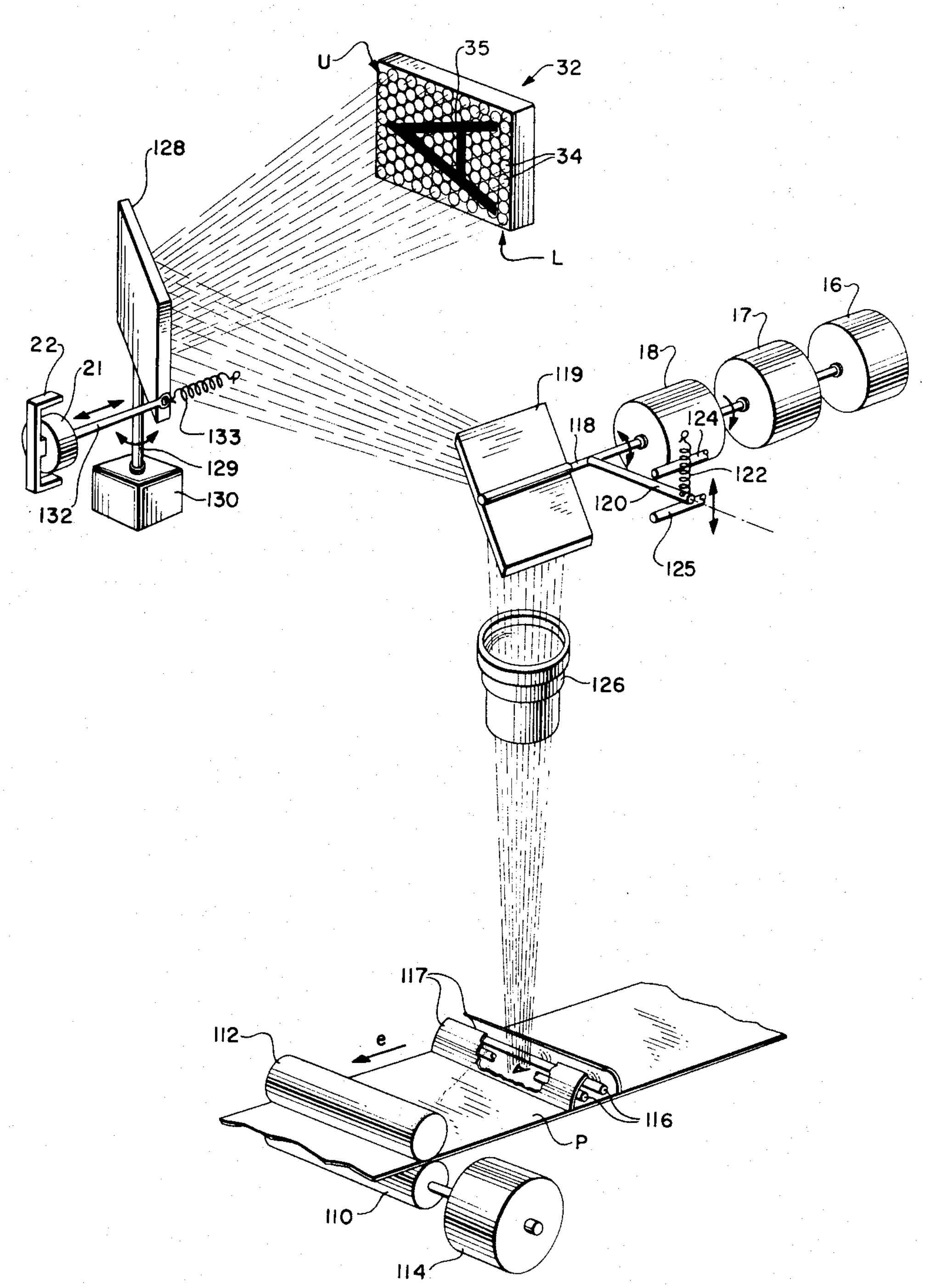
FIG. 2 illustrates how printed characters on page copy may be read by the character recognition system.

FIG. 2 shows apparatus adapted to read characters from wide sheet or page copy *p*. The copy is advanced a line at a time in the direction indicated by the arrow *e* as each line is viewed, by means of a feed roller 110 and pressure roller 112. The line feed movement may be effected in any suitable manner; one method of effecting this is to employ well known pawl and ratchet stepping mechanism in which an electromagnet operates the stepping mechanism in response to a line feed pulse. Preferably, however, a stepping motor 114 is employed for this purpose, the motor being of a well known type that will step a predetermined distance and then stop in response to each line feed pulse. The characters of each line of copy may be illuminated in any suitable manner, such as by a beam of light which is caused to advance across each line of copy by means of an oscillating mirror, although preferably a pair of elongated tubular lamps 116 are employed, together with cylindrical mirrors 117 which have the characteristic of causing the light emitted by the lamps 116 to be focused as a line of light across the copy and thereby provide uniform illumination of each line of copy in the viewing field.

A shaft 118 is rotatable, in a clockwise direction, as viewed from the lefthand end of the assembly, upon energization of the electromagnetic clutch 18, and the shaft carries a plane mirror 119 affixed thereto to effect viewing of the characters successively in each line of the copy as the mirror 119 is rotated through a limited angle. Extending from the shaft 118 is a stub shaft 120 which is actuatable from a position against a stop member 124 to a second stop member 125 when shaft 118 is rotated in a clockwise direction, the stub shaft having a return spring 122 connected thereto. Thus at the beginning of a line of copy the mirror 119 is rotated by the motor 16, reduction gear 17 and clutch 18 so that an image of each character in turn is projected through a lens 126, and from the mirror 119 is deflected onto a plane mirror 128 and from there onto the photocell array 32 to cause an image of each character, such as the image 35, to sweep across the photocell field. The identification of each character is effected in the manner hereinbefore explained in connection with reading from the tape copy.

The mirror 128 is carried by a shaft 129 rotatably mounted in a support 130; the reflecting angle of the mirror is determined by means of a rod 132 which is actuated by the centering coil 21 controlled by the centering circuit hereinbefore described, to center the projected image on the photocell area with respect to the upper and lower rows U and L of the array. Movement of the rod 132 in either direction is effected by means of the centering coil 21 and the retractile spring 123 to maintain the projected image properly centered on the photocell array.

When viewing page copy it is necessary to determine when the end of each line of text has been reached, and particularly so when that line is less than the full possible length thereof. Experience has indicated that in page copy there will not appear within the body of a text line more than two sucessive word spaces. If, therefore, three or more successive spaces are encountered, this indicates the end of a line and appropriate mechanism is provided to return the scanning mirror 119 to its starting point at the beginning of the next line and also to advance the copy into position for viewing the next line. If indentation of more than two word spaces were desired at the beginning of a new paragraph in the page copy, a counter could be provided which following a line feed operation would permit a count of substantially more than two word spaces, but for simplicity in the present disclosure it will be assumed that new paragraph indentations will not be employed in the page copy. It is also necessary to generate and send to the line the necessary functional code signals for effecting carriage return and line feed operations in a receiving teleprinter apparatus where the page copy is printed. Fig. 6 diagrammatically discloses a system for effecting the foregoing functions, and FIG. 7 shows circuit details for producing the necessary local and transmitted control signals.

Referring to FIG. 7 and assuming that the next character position viewed is a Space, the rotary stepping switch SW2 is stepped by the output of the Space detector circuit 82, this output being obtained from the Space thyratron of FIG. 4, as hereinbefore described. The receipt of a Space signal over conductor 82 applies battery through the switch wiper of bank D of SW2, through the home contact H, and the relay 84. The operation of the latter relay, at its right hand armature and make contact, applies battery over conductor 87 to the stepping magnet 88 of the switch to energize the magnet. The operation of relay 84 at its left hand armature and make contact caused relay 86 to operate and establish a circuit over conductor 92 to the third selector magnet of the perforator 68 of FIG. 5, and thus set up the code for the functional character Space. The ground potential applied by the contacts of relay 86 to the conductor 92 also causes the relay 76 of FIG. 5 to operate over conductor 71 and through the diode 77 associated with the third selector magnet. The punch cycle then is performed and the functional character Space is punched in the tape $t'$. The operation of relay 80 at its contacts 2 momentarily opens the supply circuit 58 for the Space thyratron of FIG. 4 which is extinguished; relays 84 and 86 release, and the stepping magnet 88 is deenergized whereupon the switch steps from its home position to position 1.

With the switch on position 1, if the next character position viewed should not be a Space, battery would be applied over a circuit extending from the inner contacts of one or more of the operated code pulse relays 61, 62, 64 and 65, FIG. 5, conductor 72, contact 1 and wiper of bank C of the switch SW2, FIG. 7, conductor 90, interrupter springs 89 and winding of the step magnet 88. By reason of the strapping between contacts 1 to 10 of bank C, the switch would rapidly self-step around to its home position. On the other hand, if a second Space should appear in the viewing position, the switch would be stepped to position 2 and a second Space character punched in the perforator. If the next following character position viewed should also be a Space, battery over conductor 82 and switch wiper and contact 2 of bank D will operate a line return and stepping control relay 142 (FIGS. 6 and 7) which, at its right hand armature 143 and break contact, will deenergize the electromagnetic mirror drive clutch 18, whereupon the retractile spring 122 of FIG. 2 returns the stub shaft 120 against the stop 124, the mirror 119 being rotated thereby in a counterclockwise direction to the proper position for viewing the character at the beginning of the next line of text. The operation of relay 142, FIG. 7, at its armature 143 and make contact, closes a circuit for applying an energizing pulse to the local paper feed motor 114 to effect the necessary line feed operation to bring the next line of text into the viewing field.

A cam 137 driven by a constant speed motor 136 alternately closes and opens two sets of contacts 138 and 139 at the proper times. The cam-operated contacts 138 step the switch SW2 to positions 3 and 4 successively, through the switch wiper and contacts 3 and 4 of bank E. The cam-operated contacts 139 close circuits successively, through switch wiper and contacts 3 and 4 of bank F, to conductors 144 and 146. Conductor 144 extends to the fourth selector magnet of the perforator, FIG. 5, to set up the code combination for a carriage return functional character which is then punched in the tape $t'$ for transmission, and conductor 146 extends to the second selector magnet to set up the code combination for a line feed functional character which is then punched in the tape. During the foregoing periods the relay 142, FIG. 7, was held operated by a locking circuit comprising its left hand winding and make contact, conductor 148 and strapped contacts 2 to 10 of switchbank G. When the switch reaches position 5, it self-steps to its home position by means of the wiper and contacts 5 to 10 of bank E and conductor 90 to the interrupter contacts 89 and magnet 88. When the switch is in its home position the relay 142 is released, thereby deenergizing the local line feed motor and reenergizing the mirror drive clutch 18.

The foregoing line return and line feed functions will be performed only in the event of three successive Spaces, since the stepping switch will be reset in the event of the appearance of any character other than Space, as follows: Armatures and make contacts 1 are provided on the code pulse relays 61, 62, 64 and 65, but not on pulse relay 63. The appearance of any character other than Space will cause the relays to close one or more of these contacts, completing a circuit through conductor 72 to the bank C of SW2 and thence over conductor 90 to the interrupter springs 89 to cause the switch to self-step to it home position, as hereinbefore stated. Transmission of the functional character Space does not complete this circuit and the switch is therefore free to step to its successive positions so long as uninterrupted Space signals are received.

In FIG. 3, a source of alternating current 37 is applied to one side of each of the photocells of the array, but a source of direct current may be used instead of alternating current, if desired, by a slight modification of the character matrix output circuits. For example, when direct current is employed the output circuits from the character matrix, such as the circuit for the letter "A," each has its conductors 47 and 48 (FIG. 4) connected to the input terminals of a double-balanced modulator 150, seen in FIG. 8. The modulator is of a type well known in the art, and produces an alternating current output voltage from the secondary of its output transformer 153 proportional to the magnitude of any direct current potential difference appearing on the matrix output conductors 47 and 48. The output of the modulator, after amplification if necessary, is employed to trigger the thyratron T1 individual to the letter, as in the case of alternating current powered photocells.

An output from the modulator is produced regardless of the polarity of the potential difference between the conductors 47 and 48, the phase sense of the output corresponding to the polarity of the input. Since an output caused by a reversed input might cause spurious operation, reversed input unbalances are suppressed by a diode 152. The circuitry of the "Space" thyratron may remain as in FIG. 4.

When direct current is applied to the photocells the output of the centering circuit from the character matrix of FIG. 3, comprising conductors 42 and 43, is modified as shown in FIG. 9. These conductors are connected to the input terminals of a single-balanced modulator 154 of well-known type. In this case the output of the modulator has a mean value when no direct current unbalance is applied to the input, a minimum value for one polarity of input unbalance, and a maximum value for the opposite polarity of input unbalance. The output is rectified by a diode 156 and applied to the grid of control VT1, as in the alternating current case.

Various modifications of the system illustrated, and various equivalents or substitutes of the devices depicted, will likely occur to those versed in the art without departing from the spirit of the invention which therefore is not to be regarded as limited except as indicated by the scope of the appended claims.

We claim:

1. Character reading apparatus comprising means for holding page copy having successive lines of characters to be read, means for producing a beam of energizing rays, an array of devices each of which includes means for causing an electrical potential to be produced when the device is exposed to said beam, means for causing said beam to successively view the characters in each line to be read and to cause an image of each character in turn to fall upon said array of potential-producing devices to cover certain of the devices and leave the remaining ones uncovered with respect to said beam, means electrically connecting said devices in predetermined different groupings of selected ones only of said devices and in which the groups respectively are individual to different characters with certain of the potential-producing devices of each group covered by the image of the character currently being viewed and the others of said group left uncovered by said image, means for integrating the potentials produced by the devices covered by the image of the character currently being viewed to obtain a first summation potential, means for integrating the potentials of particular ones of the devices left uncovered by said image to obtain a second summation potential, means for integrating the first and second summation potentials in a manner to produce a resultant potential representing the character currently being viewed and which is different from the resultant potential produced by any other of said groups at any time and different from the resultant potential produced as a result of viewing any other character, means responsive to said first named resultant potential for producing electrical output signals representing the particular character currently viewed by said beam, means automatically operative when the ends of said successive lines of the text appear in the viewing field for generating line return and line feed signals and means responsive to said last named signals for effecting relative movement between said beam and said page copy to a position to cause the beam to view the first character appearing in the next line of the text to be read.

2. Apparatus according to claim 1, including line feed mechanism responsive to said line feed signals for advancing the page copy line at a time as the successive lines of characters of the text are read.

3. Apparatus according to claim 1, including an outgoing telegraph circuit, means responsive to said line return and line feed signals for producing permutation code carriage return and line feed functional signals for controlling a telegraph page printer, and means for transmitting said functional signals over said outgoing circuit.

4. Apparatus according to claim 1, including means operative when a predetermined number of successive blank character spaces in a line of copy have been viewed for generating said line return and line feed signals.

5. Apparatus according to claim 4, including means for automatically counting said blank character spaces as they are viewed, and means for normalizing said counting means after said line reutrn and line feed signals have been generated.

6. Apparatus according to claim 4, including means for automatically counting the number of blank character spaces as they are viewed, and means for normalizing said counting means in the event that the successive character spaces are less than said predetermined number.

7. Character reading apparatus comprising means for supporting copy having upper case characters and lower case characters to be read, means for producing a beam of energizing rays, an array of devices each of which includes means for causing an electrical potential to be produced when the device is exposed to said beam, means for causing said beam to successively view the characters to be read and to cause an image of each character in turn to fall upon said array of potential-producing devices to cover certain of the devices and leave the remaining ones uncovered with respect to said image, means electrically connecting said devices in predetermined different groupings of selected ones only of said devices and in which the groups respectively are individual to different chraacters with certain of the potential-producing devices of each group covered by the image of the character currently being viewed and the others of said group left uncovered by said image, means for integrating the potentials produced by the devices covered by the image of the character currently being viewed to obtain a first summation potential, means for integrating the potentials of particular ones of the devices left uncovered by said image to obtain a second summation potential, means for integrating the first and second summation potentials in a manner to produce a resultant potential representing the character currently being viewed and which is different from the resultant potential produced by any other of said groups at such time and different from the resultant potential produced by said group as a result of viewing any other character at any time, means responsive to said first named resultant potential for producing electrical output signals representing the particular character currently viewed by said beam, means operative as each character currently is viewed by said beam to detect a change in the character case from that of the case of the preceding character and produce electrical output signals representing a case-determining functional character adapted to control a recording device having upper case and lower case recording characteristics, and means for producing signals representing the character currently being viewed after said case-determining functional character has been produced.

8. Character reading apparatus comprising means for supporting copy having characters to be read, means for producing a beam of energizing rays, an array of devices each of which includes means for causing an electrical potential to be produced when the device is exposed to said beam, means for causing said beam to successively view the characters to be read and to cause an image of each character in turn to fall upon said array of potential-producing devices to cover certain of the devices and leave the remaining ones uncovered with respect to said image, means electrically connecting said devices in predetermined different groupings of selected ones only of said devices and in which the groups respectively are individual to different characters with certain of the potential-producing devices of each group covered by the image of the character currently being viewed and the others of said group left uncovered by said image, means for integrating the potentials produced by the devices covered by the image of the character currently being viewed to obtain a first summation potential, means for integrating the potentials of particular ones of the devices left uncovered by said image to obtain a second summation potential, means for integrating the first and second summation potentials in a manner to produce a resultant potential representing the character currently being viewed and which is different from the resultant potential produced by any other of said groups at such time and different from the resultant potential produced by said group as a result of viewing any other character at any time, means responsive to said first named resultant potential for producing electrical output signals representing the particular character currently viewed by said beam, means for translating said electrical output signals into permutation by code telegraph signals representing the characters viewed by said beam, and outgoing telegraph circuit and means for transmitting said permutation code character signals over said circuit.

9. Character reading apparatus comprising means for supporting copy having characters to be read, means for producing a beam of energizing rays, an array of devices each of which includes means for causing an electrical potential to be produced when the device is exposed to said beam, means for causing said beam to successively view the characters to be read and to cause an image of each character in turn to fall upon said array of potential producing devices to cover certain of the devices and leave the remaining ones uncovered with respect to said image, means electrically connecting said devices in predetermined different groupings of selected ones only of said devices and in which the groups respectively are individual to different characters with certain of the potential-producing devices of each group covered by the image of the character currently being viewed and the others of said group left uncovered by said image, means for integrating the potentials produced by the devices covered by the image of the character currently being viewed to obtain a first summation potential, means for integrating the potentials of particular ones of the devices left uncovered by said image to obtain a second summation potential, means for integrating the first and second summation potentials in a manner to produce a resultant potential representing the character currently being viewed and which is different from the resultant potential produced by any other of said groups at such time and different from the resultant potential produced by said group as a result of viewing any other character at any time, means responsive to said first named resultant potential for producing electrical output signals representing the particular character currently viewed by said beam, means for translating said electrical output signals into permutation code telegraph signals representing the characters viewed by said beam, an outgoing telegraph circuit, means for transmitting said permutation code character signals over said circuit and means for automatically inserting start and rest pulses in each group of permutation code signals representing a character to provide start-stop signals adapted to control start-stop telegraph recording apparatus.

10. Apparatus for electrically reading in succession graphic characters having standardized outlines carried on a record medium, comprising: means for producing a beam of energizing rays; a rectangular array of devices each of which includes means for causing an electrical potential to be produced when the device is exposed to said beam; scanning means for causing said beam to view the characters on said record medium successively and to cause an image of each character in turn to fall upon said array of devices so that some of said devices are covered by said image and remaining ones of said devices are uncovered with respect to said image; means for controlling said scanning means to center said image between opposite ends of said rectangular array of devices; circuit means connected between certain of said devices at opposite ends of said array and the control means to adjust the scanning means for centering said image when said image is off center and more of the devices are covered at one of said ends of the array than at the other of said ends; means for integrating the potentials produced only by the devices covered by said image to produce a first summation potential; means for integrating the potentials of only particular ones of the remaining devices uncovered with respect to said image to produce a second summation potential, said particular ones being devices which would be covered by an image of at least one other character similar in outline to the outline of the character being viewed by said beam; means for integrating the first and second summation potentials to produce a resultant electrical potential; and means for comparing said resultant electrical potential with other electrical potentials corresponding respectively to a plurality of characters having standardized outlines to determine and identify the character being viewed by said beam with one of said plurality of characters, whereby each of the graphic characters on said medium is accurately read electrically in turn.

11. Apparatus for electrically reading in succession graphic characters having standardized outlines carried on a continuously moving record medium, comprising: means for producing a beam of energizing rays; an array of devices each of which includes means for causing an electrical potential to be produced when the device is exposed to said beam; scanning means for causing said beam to view the characters on said record medium successively and to cause an image of each character in turn to fall upon said array of devices so that some of said devices are covered by said image and remaining ones of said devices are uncovered with respect to said image; means for integrating the potentials produced only by the devices covered by said image to produce a first summation potential; means for integrating the potentials of only particular ones of the remaining devices uncovered with respect to said image to produce a second summation potential, said particular ones being devices which would be covered by an image of at least one other character similar in outline to the outline of the character being viewed by said beam; means for integrating the first and second summation potentials to produce a resultant electrical potential; and means for comparing said resultant electrical potential with other electrical potentials corresponding respectively to a plurality of characters having standardized outlines to determine and identify the character being viewed by said beam with one of said plurality of characters, whereby each of the graphic characters on said medium is accurately read electrically in turn.

12. Character reading apparatus comprising means for supporting copy having characters to be read, means for producing a beam of energizing rays, an array of devices each of which includes means for causing an electrical potential to be produced when the device is exposed to said beam, means for causing said beam to successively view the characters to be read and to cause an image of each character in turn to fall upon said array of potential-producing devices to cover certain of the devices and leave the remaining ones uncovered with respect to said image, means electrically connecting said devices in predetermined different groupings of selected ones only of said devices and in which the groups respectively are individual to different characters with certain of the potential-producing devices of each group covered by the image of the character currently being viewed and the others of said group left uncovered by said image, means for integrating the potentials produced by the devices covered by the image of the character currently being viewed to obtain a first summation potential, means for integrating the potentials of particular ones of the devices left uncovered by said image to obtain a second summation potential, means for integrating the first and second summation potentials in a manner to produce a resultant potential representing the character currently being viewed and which is different from the resultant potential produced by any other of said groups at such time and different from the resultant potential produced by said group as a result of viewing any other character at any time, and means responsive to said first named resultant potential for producing electrical output signals representing the particular character currently viewed by said beam.

References Cited by the Examiner

UNITED STATES PATENTS

| | | | |
|---|---|---|---|
| 2,362,027 | 11/44 | Rabenda | 234—23 |
| 2,573,317 | 10/51 | Doty | 234—23 |
| 2,859,276 | 11/58 | Saykay | 234—23 |
| 2,902,092 | 9/59 | Hildebrandt | 234—23 |
| 2,978,675 | 4/61 | Highleyman | 340—146.3 |
| 2,980,225 | 4/61 | Intagliata et al. | 234—23 |
| 3,021,998 | 2/62 | Brewer | 234—23 |

MALCOLM A. MORRISON, *Primary Examiner.*

WALTER W. BURNS, Jr., EVERETT R. REYNOLDS, *Examiners.*